US011762941B2

(12) United States Patent
Gulati et al.

(10) Patent No.: US 11,762,941 B2
(45) Date of Patent: Sep. 19, 2023

(54) USER-CUSTOMIZED HOMEPAGE FOR WIDGETS CONFIGURED TO RETRIEVE AND DISPLAY DATA FROM DEFINED NETWORK LOCATIONS

(71) Applicant: MICROSOFT TECHNOLOGY LICENSING, LLC, Redmond, WA (US)

(72) Inventors: Ishan Gulati, Delhi (IN); Kirti Kumar Sharma, Bangalore (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 17/364,574

(22) Filed: Jun. 30, 2021

(65) Prior Publication Data
US 2022/0414179 A1 Dec. 29, 2022

(30) Foreign Application Priority Data
Jun. 28, 2021 (IN) .............................. 202141028963

(51) Int. Cl.
*G06F 17/00* (2019.01)
*G06F 16/957* (2019.01)
(Continued)

(52) U.S. Cl.
CPC ........ *G06F 16/9577* (2019.01); *G06F 16/951* (2019.01); *G06F 16/958* (2019.01);
(Continued)

(58) Field of Classification Search
CPC .............. G06F 16/9577; G06F 16/958; G06F 16/9566; G06F 16/951; H04L 63/083
(Continued)

(56) References Cited

U.S. PATENT DOCUMENTS 7,546,543 B2 * 6/2009 Louch ....................... G06F 8/38
715/767
7,873,911 B2   1/2011 Gopalakrishnan
(Continued)

OTHER PUBLICATIONS

Sergey Tkachenko, Group Tiles in Start Menu in Windows 10, published Aug. 29, 2018 via winaero.com, pp. 1-7 (pdf).*
(Continued)

*Primary Examiner* — Manglesh M Patel
(74) *Attorney, Agent, or Firm* — Newport IP, LLC; Jacob P. Rohwer

(57) ABSTRACT

A system that improves productivity and computer access to various network sites by providing users with a single stop destination for consumption of information that is spread across multiple network sites is described. A user interface (UI) view is customizable in the sense that each user is enabled to define the type of information to be displayed, as well as the way the information is organized. To do this, the system is configured to expose various options for configuring the UI view. The options enable a user to create a widget, which is a mechanism configured to retrieve data from a target location and display the data in a tile of the UI view. Accordingly, the UI view acts as a container for multiple widgets configured at the user level, thereby providing a one stop solution for the network information that is of continued interest to a particular user.

17 Claims, 10 Drawing Sheets

(51) Int. Cl.
G06F 16/958 (2019.01)
G06F 16/955 (2019.01)
G06F 16/951 (2019.01)
H04L 9/40 (2022.01)
G06N 3/08 (2023.01)
G06N 5/022 (2023.01)

(52) U.S. Cl.
CPC ........... *G06F 16/9566* (2019.01); *G06N 3/08* (2013.01); *G06N 5/022* (2013.01); *H04L 63/083* (2013.01)

(58) Field of Classification Search
USPC ........................................................ 715/234
See application file for complete search history.

(56) References Cited

U.S. PATENT DOCUMENTS

| | | | |
|---|---|---|---|
| 8,302,020 B2* | 10/2012 | Louch | B60K 35/00 715/767 |
| 8,321,801 B2* | 11/2012 | Chaudhri | G06F 3/04842 715/764 |
| 8,453,065 B2 | 5/2013 | Chaudhrl et al. | |
| 8,910,067 B1 | 12/2014 | Anderson | |
| 8,924,869 B2* | 12/2014 | Fellman | G06F 9/451 715/762 |
| 8,997,180 B2 | 3/2015 | Cairns et al. | |
| 9,720,554 B2 | 8/2017 | Frohwein | |
| 2009/0044138 A1* | 2/2009 | Rudolph | G06F 16/958 715/765 |
| 2009/0100329 A1* | 4/2009 | Espinoza | G06F 9/44521 715/234 |
| 2009/0260022 A1 | 10/2009 | Louch et al. | |
| 2009/0288014 A1* | 11/2009 | Fujioka | G06F 16/958 707/E17.014 |
| 2010/0031147 A1* | 2/2010 | Williams | G06F 16/958 715/716 |
| 2010/0281393 A1* | 11/2010 | Fujioka | G06F 16/958 715/745 |
| 2012/0137227 A1* | 5/2012 | Gerken, III | G06F 8/38 715/747 |
| 2013/0191723 A1* | 7/2013 | Pappas | G06F 40/143 715/234 |
| 2013/0347070 A1* | 12/2013 | Cairns | H04W 4/60 726/3 |
| 2014/0019847 A1* | 1/2014 | Osmak | G06F 40/186 715/234 |
| 2016/0246490 A1 | 8/2016 | Cabral | |
| 2018/0024730 A1 | 1/2018 | Jambou | |
| 2018/0174229 A1 | 6/2018 | Sherwin et al. | |
| 2020/0133982 A1 | 4/2020 | Thangeswaran et al. | |
| 2022/0300633 A1* | 9/2022 | LeVasseur | G06F 21/6218 |

OTHER PUBLICATIONS

Lance Whitney, How to Tweak Your Tiles in Windows 10, published May 22, 2017, via PC Mag, pp. 1-16 (pdf).*

Baskaran, et al., "Apple reimagines the iPhone experience with iOS 14", Retrieved from: https://www.apple.com/in/newsroom/2020/06/apple-reimagines-the-iphone-experience-with-ios-14/, Jun. 22, 2020, 22 Pages.

Feist, Jonathan, "Android Customization—how to create a custom clock widget using Zooper Widget", Retrieved from: https://www.androidauthority.com/zooper-widget-clock-366476/#:~:text=Zooper%20Widget%20is%20an%20app,features%20to%20your%20Home%20screen, May 15, 2014, 19 Pages.

Hidinger, et al., "Adaptive Cards Overview", Retrieved from: https://docs.microsoft.com/en-us/adaptive-cards/, Jun. 26, 2017, 6 Pages.

"International Search Report and Written Opinion Issued in PCT Application No. PCT/US22/030153", dated Sep. 15, 2022, 11 Pages.

* cited by examiner

USER-CUSTOMIZED HOMEPAGE FOR WIDGETS CONFIGURED TO RETRIEVE AND DISPLAY DATA FROM DEFINED NETWORK LOCATIONS

PRIORITY APPLICATION

This application claims the benefit of and priority to Indian (IN) Non-Provisional Application No. 202141028964, filed Jun. 28, 2021, the entire contents of which are incorporated herein by reference.

BACKGROUND

Users that spend a considerable amount of time on computers, for work reasons, typically are required to monitor and/or periodically check into different network sites for updated information and/or so they do not miss important information. In many instances, these users also want to monitor and be made aware of information that recently surfaces via other network sites for personal reasons. These personal and/or work-related network sites may include, for example, email portals, enterprise management system portals (e.g., a developer operations site), productivity portals, calendars with work and/or personal appointment objects, storage sites that maintain work and/or personal files, social media sites, collaboration tools (e.g., video conferencing and group chats), financial accounts (e.g., bank account, equity account, retirement account, etc.), etc. These network sites may further include public web sites where the user can sign in via a personal account to see personal and/or customized information (e.g., news sites, sports sites, weather sites, financial information sites, product sites, e-commerce sites, ticket sales sites, streaming television or video sites, map sites, social media sites, etc.).

Consequently, these users often find themselves switching between different user interface (UI) views (e.g., application windows, browser windows, operating system UIs, etc.) on various user devices to consume content. For example, some users have upwards of twenty or thirty different UI views open at a given time. This switching process has the potential to waste time as the user often has to sort through and/or find different UI elements (e.g., icons, tabs, etc.) in different locations just to access a desired site. At the very least, the user experience is affected by the need to switch between different UI views.

It is with respect to these and other considerations that the disclosure made herein is presented.

SUMMARY

The techniques disclosed herein are intended to improve productivity and computer access to various network sites by providing users (e.g., enterprise users) with a single stop destination for consumption of important information that is spread across multiple network sites. This helps solve the frustrations hinted on above because a user can keep track of information available on multiple network sites by only looking at a single user interface (UI) view. This single UI view may be referred to or serve as a "homepage", or alternatively, as a "dashboard". In some examples, the single UI view may be displayed via a browser. That is, the single UI view may be the first tab configured when a browser is opened. In other examples, the single UI view may be displayed via a different component executing on a user device, such as an operating system component or a dedicated application.

A system described herein is configured to expose various options for configuring the single UI view. The options enable a user to create a widget for the single UI view. A widget is a mechanism configured to retrieve data from a target location and display the data in a space, in the single UI view, that is allocated to the widget. A widget displayed in the single UI view is also configured to allow for user interaction and perform functionality based on the user interaction (e.g., allow for a user to reply to an email, change the status of a ticket or a task, be redirected to a videoconference meeting based on clinking a link in a calendar appointment, etc.). The space allocated to the widget may be referred to as a tile. The target location can be a resource locator, such as uniform resource locator (URL). Accordingly, the single UI view acts as a container for multiple widgets configured at the user level, thereby providing a one stop solution for most, if not all, of the network and/or device information that is or is likely to be of continued interest to a particular user.

The user can designate a widget to be one of different types, so that the functionality and the user experience offered by the single UI view better reflects what the user desires. The widget tiles can be configured as selectable UI elements such that they can be activated via a mouse click, a touch, a key press, or some other sort of user input. A first type of widget includes an "embedded view" widget. A user can define content to be displayed while an embedded view widget is in an inactive state. For example, the embedded view widget can be configured to display, while the tile is in an inactive state, an icon or some other sort of graphical representation for the target location. In another example, an embedded view widget can be configured to initially retrieve and display, while the tile is in an inactive state, first data that represents the target location. The first data can be a still image or some general information associated with the target location. When the tile is selected and activated by a user, the embedded view widget is configured to operate in an active state where it continually retrieves and displays second data from the target location and display the second data in the single UI view. The second data may be more in-depth compared to the first data. For example, the second data may include video data, a really simple syndication (RSS) feed, or map routes or directions. The user may define a default state (e.g., active state, inactive state, etc.) for an embedded view widget. Consequently, an embedded view widget can be particularly useful for target locations that update data in real-time (e.g., a streaming video site such as a live channel). The embedded view widget can be useful for other types of sites as well.

A second type of widget includes a "UI template" widget. A UI template widget describes a framework for retrieving and displaying data retrieved from a target location in a standard format (e.g., JavaScript Object Notation (JSON)). For example, a template widget can be configured as an adaptive card that retrieves, via an application programming interface (API), JSON data from a target location. Adaptive cards are platform-agnostic templates for light-weight UIs, that are authored in JSON and that can be openly exchanged by different applications and services. Accordingly, a target location identified via a UI template, such as an adaptive card, may include a platform that connects multiple applications, services, and/or devices. Examples of these type of platforms include MICROSOFT GRAPH, AZURE DEVOPS, or any open JSON API that does not require authentication. When delivered to a widget tile on the single UI view, the JSON data is transformed into a native or localized UI that automatically adapts to its surroundings. In various examples, an adaptive card can use authorization tokens so that protected information (e.g., user account information such as emails in an inbox) can be retrieved and/or refreshed by a widget over a period of time. Consequently, a user can configure a UI template widget to select a preconfigured UI template from a UI template library (e.g., an adaptive card library) that allows for the retrieval of standard format data (e.g., JSON data) via API calls.

A third type of widget includes a "redirect link" widget. A redirect link widget redirects a user to a separate UI view associated with a target location when the widget is activated and selected by a user. As described above, in one example, the target location is a URL for a stie. In this example, the data retrieved and displayed via a redirect link widget is high-level data (e.g., select pieces of information) that the user can view to grasp a general and/or a temporal understanding of a state or a context of content at the site. If the user sees something of interest in a tile for the redirect link widget, the user may activate the widget by clicking on the tile and the user is redirected to the site so the user can see more detailed information. This redirect action will take the user away from the single UI view (e.g., switch active tabs in a browser from the homepage to the site). Alternatively, a redirect link widget can merely display an icon that represents the URL and the site.

For organizational purposes, the user can customize the display of widgets in the single UI view into multiple categories. The categories, and a selection of a specific category for a widget, can be defined by the user. Alternatively, the categories can be defined by a system based on artificial intelligence and/or machine learning algorithms configured to organize content and applications for the user based on factors such as the most frequently used, most recently used, etc. Furthermore, the system described herein provides the users with options to define sizes and/or colors (e.g., text color, background color, etc.) for the widget tiles.

Finally, the user can designate the ability for a widget to switch from a default state to an expanded state. The switch may occur when the widget tile is activated. This ability is most likely associated with embedded view widgets or UI template widgets, as activation of a redirect link widget takes the user away from the single UI view. The expanded state increases the amount of UI space for a widget tile. In this way, the user can see more data (e.g., more email items listed in an inbox) retrieved from a target location and/or more easily interact with the data without moving away from the single UI view. To further improve user accessibility, a widget can be configured in different views/arrangements for different form factors (e.g., a smartphone, a desktop computer, etc.) that provide different display space.

The techniques disclosed herein provide a number of features that improve existing computing devices. For instance, a computing device does not have to expend extra resources (e.g., computing resources such as processor cycles, memory resources, etc.) to switch between UI views, thereby conserving power of a computing device. Moreover, the user experience with regard to accessing and/or displaying content that is continually, over a period of time, of interest to a particular user. Other technical benefits not specifically mentioned herein can also be realized through implementations of the disclosed subject matter.

This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

The following Detailed Description discloses a system that improves productivity and computer access to various network sites by providing users (e.g., enterprise users) with a single stop destination for consumption of important information that is spread across multiple network sites. The single stop destination is a user interface (UI) view that is customizable in the sense that each user is enabled to define the type of information to be displayed, as well as the way the information is organized when displayed. To do this, the system is configured to expose various options for configuring the single UI view. The options enable a user to create a widget for the single UI view. A widget is a mechanism configured to retrieve data from a target location and display the data in a space, in the single UI view, that is allocated to the widget. A widget displayed in the single UI view is also configured to allow for user interaction and perform functionality based on the user interaction (e.g., allow for a user to reply to an email, change the status of a ticket or a task, be redirected to a videoconference meeting based on clinking a link in a calendar appointment, etc.). The space allocated to the widget may be referred to as a tile. The target location can be a resource locator, such as uniform resource locator (URL). Accordingly, the single UI view acts as a container for multiple widgets configured at the user level, thereby providing a one stop solution for most, if not all, of the network and/or device information that is or is likely to be of continued interest to a particular user.

Various examples, scenarios, and aspects that allow for the configuration and display of a single UI view, are described below with reference to FIGS. 1-7.

Figure 1:
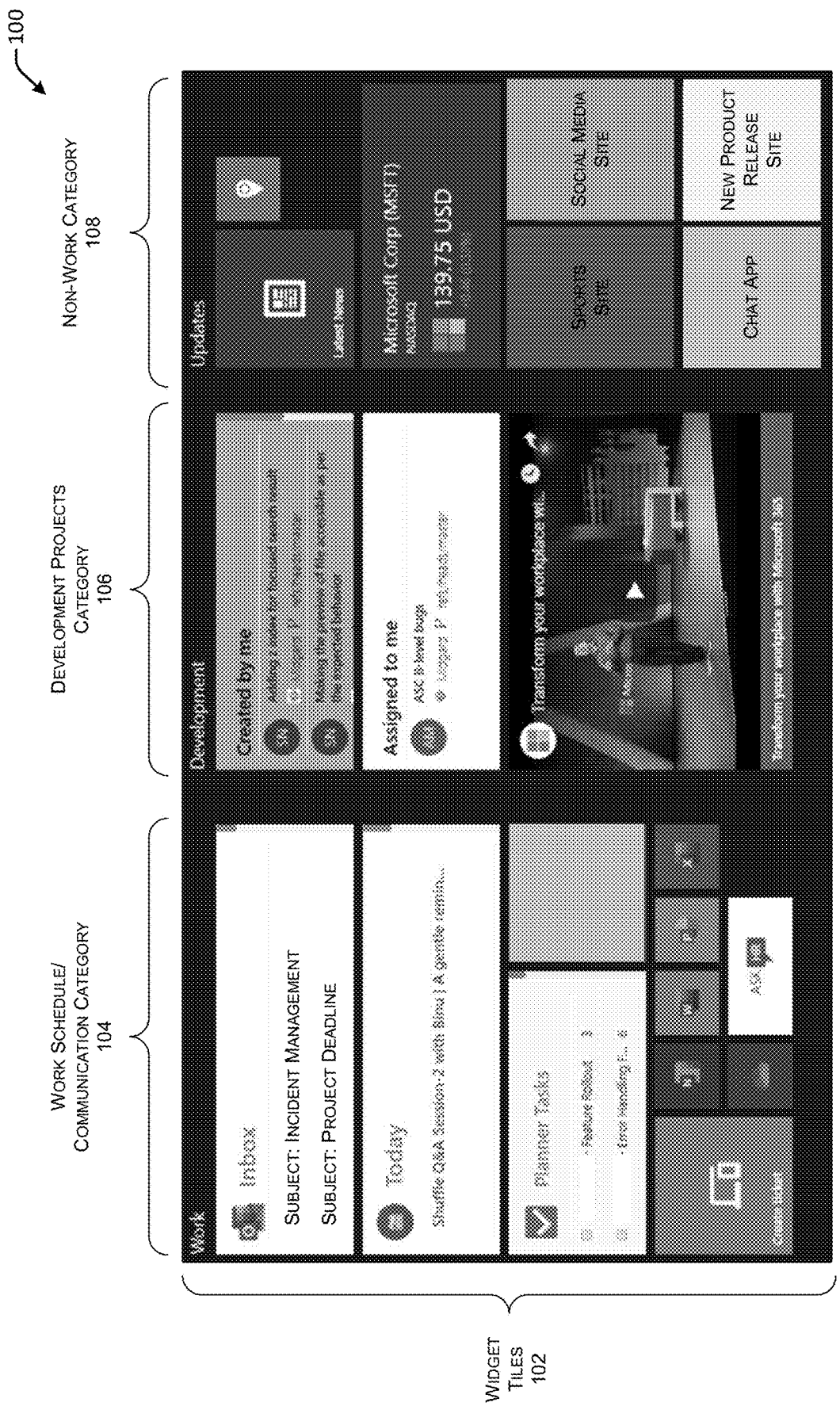
FIG. 1 illustrates an example graphical user interface (GUI) that shows a single user interface (UI) view (e.g., a homepage, a dashboard) that displays various types of widgets configured to retrieve and display information from target locations.

FIG. 1 illustrates an example graphical user interface (GUI) 100 that shows a single user interface UI view (e.g., a homepage, a dashboard) that displays various types of widgets configured to retrieve and display information from target locations. As shown, the single UI view includes a number of widget tiles 102, or display spaces allocated to the various widgets configured within the single UI view. The widget tiles may vary in size and/or color so the user can implement a customized approach to viewing information.

In one example, the single UI view may be displayed via a browser. That is, the single UI view may be the first tab configured when a browser is opened. In other examples, the single UI view may be displayed via a different component executing on a user device, such as an operating system component or a dedicated application.

The user can customize the display of widgets in the single UI view into multiple categories. As shown in FIG. 1, this example user who is a developer at a technology company, has defined a first work schedule/communication category 104 for the left side of the single UI view. For illustration purposes, this category 104 includes a first widget configured to retrieve email items from an inbox, a second widget that includes appointments on a work calendar, a third widget that lists personal tasks to be worked on or completed from a planner, and so forth.

The user has also defined a development projects category 106 for which tiles are displayed in the middle of the single UI view. For illustration purposes, this category 106 includes a first widget configured to list development projects (e.g., files) created by the user via a development portal, a second widget that lists projects assigned to the user via a development portal, and a third widget that shows a live streaming channel that broadcasts presentations related to the development industry.

Finally, in this example, the user has defined a non-work category 108 for the right side of the single UI view. This category includes a first widget that lists the latest news, a second widget that lists the stock price of a company in which the user is interested (e.g., MICROSOFT or stock ticker "MSFT"), a third widget associated with a sports site, a fourth widget associated with a social media site, a fifth widget associated with a chat application, and a sixth widget associated with a site that surfaces information about new product releases. The number of categories and/or the number of widget tiles 102 configured in a category is not limited, and those shown are provided as examples only.

Figure 2:
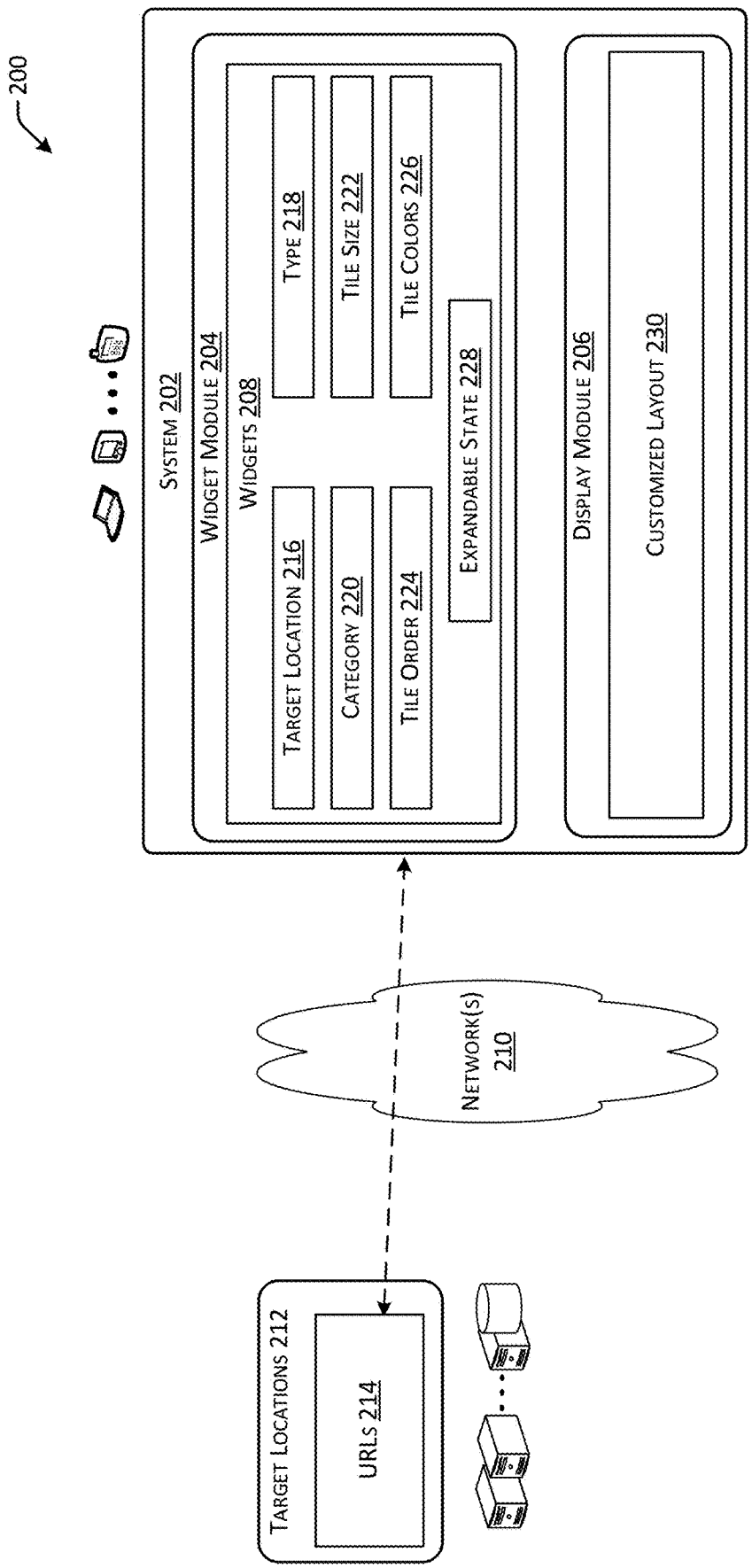
FIG. 2 is a diagram illustrating an example environment in which a user can set up a single UI view and/or use the single UI view to display various types of widgets configured to retrieve and display information from target locations.

Accordingly, a user, such as the one represented in the example of FIG. 1, is able to customize a single UI view so that they can access desired information in one place. FIG. 2 is a diagram illustrating an example environment 200 in which a user can set up a single UI view and/or use the single UI view to display various types of widgets configured to retrieve and display information from target locations. The example environment includes a system 202 (e.g., a user device) that comprises a widget module 204 and a display module 206. The number of illustrated modules in the system 202 is just an example, and the number can vary higher or lower. That is, functionality described herein in association with the illustrated modules can be performed by a fewer number of modules or a larger number of modules on one device or spread across multiple devices.

As shown, the widget module 204 includes various widgets 208 that have been configured by a user of the system 202 based on one or more settings. As further discussed herein with respect to FIG. 3, the widget module 204 is configured to expose various options and/or entry fields so a user can define the settings for an individual widget. As mentioned above, the widgets 208 are mechanisms configured to retrieve data, over network(s) 210, from target locations 212. The target locations 212 may be personal network sites and/or work-related network sites. These may include, for example, email portals, enterprise management system portals (e.g., a developer operations site), productivity portals, calendars with work and/or personal appointment objects, storage sites that maintain work and/or personal files, social media sites, collaboration tools (e.g., video conferencing and group chats), financial accounts (e.g., bank account, equity account, retirement account, etc.), news sites, sports sites, weather sites, product sites, e-commerce sites, ticket sales sites, streaming television or video sites, map sites, etc. In some instances, the target locations may be local to the system 202 such that network communications are not needed to retrieve the data.

The data can then be displayed in the tiles 102 of the single UI view that are allocated to the widgets 208. The target locations can be identified via resource identifiers, such as uniform resource locators (URLs) 214. Accordingly, a first setting defined by a user for an individual widget 208 includes a target location 216 (e.g., a URL) from which the data to be displayed in a tile is to be sourced.

A second setting comprises a type 218 of widget. Different types 218 of widgets can be configured to retrieve and/or display information in the single UI view in different ways. A type 218 of widget can include an embedded view, a UI template, or a redirect link. These are discussed below with respect to FIGS. 4A-4C. However, the techniques described herein can be used with other types 218 of widgets as well.

A third setting comprises a category 220 for the widget. Corresponding tiles can be organized, in the single UI view, according to different categories defined by the user. This helps with the productivity aspects of the single UI view because widget tiles, related in some way or form from the perspective of the user, can be grouped together.

A fourth setting can comprise a tile size 222. The tile size 222 can be defined by the user so that more important widgets can be allocated more display space. For instance, the user may want a widget tile that lists email items to be larger in size compared to a widget tile that lists calendar objects/appointments. In this sense, the user is more interested in seeing more recently received emails rather than an increased number of calendar appointments on the user's schedule.

A fifth setting can include a tile order 224, within a single category for example. The tile order 224 may be important as a number of displayed tiles increases. For instance, the user may want the more important widgets displayed towards the top of the single UI view (e.g., top of a category column). In some embodiments, the single UI view is a non-scrollable UI, and thus, as widgets are added the sizes of less important widgets (e.g., on the bottom of the single UI view are automatically reduced to accommodate the additional widgets. Therefore, the tile order 224 can be an important setting when the goal is to provide a user with an effective and efficient way of viewing pertinent information.

A sixth setting can include tile colors 226. The colors 226 may define a color of text used in the widget tile and/or a background color for the tile, displayed behind the data retrieved from the target location.

A seventh setting can include whether a widget tile is to be displayed in an expanded state 228. In some instances, the tile size 222 setting defines a default state for a widget. Since display space is valuable on the single UI view, the default size may be limited. In order for the user to view additional data associated with a widget tile (e.g., additional emails in an inbox), the expanded state 228 enables the size of a widget tile to expand to a second size when the widget is activated (e.g., when the widget tile is selected). This is discussed below with respect to FIG. 4D.

In various examples, a widget tile may be configured to be displayed in multiple expanded states where each expanded state is of a different size. For example, a first expanded state may accommodate the display of four items (e.g., four emails, four appointments in a calendar, four tasks on a task list, etc.), a second expanded state may accommodate the display of six items, a third expanded state may accommodate the display of eight items, and so forth. A user may be able to switch, in a looping manner, between the various states by activating (e.g., clicking on) the tile or a dedicated user interface element (e.g., a button) that loops through the various states (e.g., normal size, first expanded size, second expanded size, etc.).

The display module 206, such as a browser or a mobile application, is configured to create the customized layout 230 based on the settings of the widgets 208, and output the customized layout on a display screen. In one example, the customized layout 230 includes a user-defined setting regarding the positions of the categories (e.g., categories 104, 106, 108, etc.) on the single UI view. The display module 206 is also configured to receive user input associated with configuring a widget and/or interacting with the single view UI, as further described herein. Accordingly, the single UI view acts as a container for multiple widgets configured at the user level, thereby providing a one stop solution for most, if not all, of the network and/or device information that is or is likely to be of continued interest to a particular user. The container may be bound to a user account such that it can shared across different devices, and the container can generate different UI views based on the use case and/or form factor of an individual device.

Figure 3:
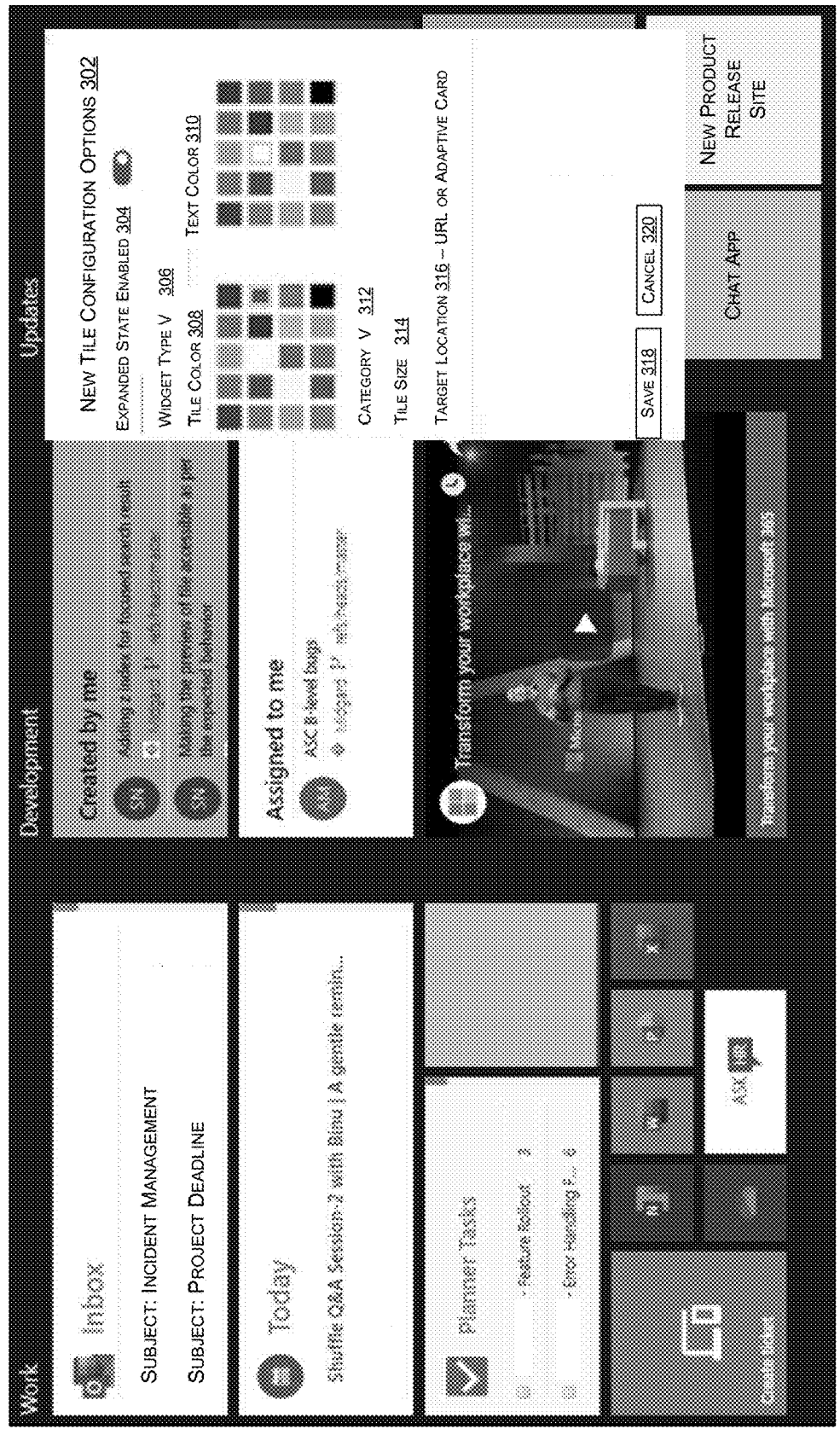
FIG. 3 illustrates an example GUI that enables a user to configure a widget to be added to the single UI view.

FIG. 3 illustrates an example GUI 300 that enables a user to provide input useable to configure a widget to be added to the single UI view. As shown, a menu of configuration options 302 is displayed over the single UI view illustrated in FIG. 1. The menu of configuration options 302 enables a user to select and/or define customized settings for a widget to be added to the single UI view. As shown, a user can select whether the expanded state is to be enabled 304. The user can select a type of widget supported by the single UI view from a drop down menu 306. The user can select a tile color 308 and/or a text color 310 from a palette of displayed color options. The user can select a widget category 312 from a drop down menu. In some instances, the user can provide input that defines a textual title for the widget. Further, the user can define a tile size 314 for a widget tile.

The menu of configuration options 302 also enables a user to define the target location in a target location field 316. Depending on the widget type 306 select, the target location 316 option may be configured to accept: a URL, authentication, or a UI template identifier such as an adaptive card. In this way, the widget knows where to go to retrieve the data to be displayed. In one example, the target location is a resource locator such as a URL. In another example, the target location field can list a UI template, such as an adaptive card, that retrieves standard format data (e.g., JSON data) from a target location. Adaptive cards are platform-agnostic templates for light-weight UIs, that are authored in JSON and that can be openly exchanged by different applications and services. Accordingly, a target location identified via a UI template, such as an adaptive card, may include a platform that connects multiple applications, services, and/or devices. Examples of these type of platforms include MICROSOFT GRAPH, AZURE DEVOPS, or any open API that does not require authentication.

Finally, the menu of configuration options 302 includes options for the users to save 318 the selected and/or defined settings (e.g., create and/or edit the widget) or to cancel 320 the selected and/or defined settings (e.g., not create the widget).

Figure 4A:
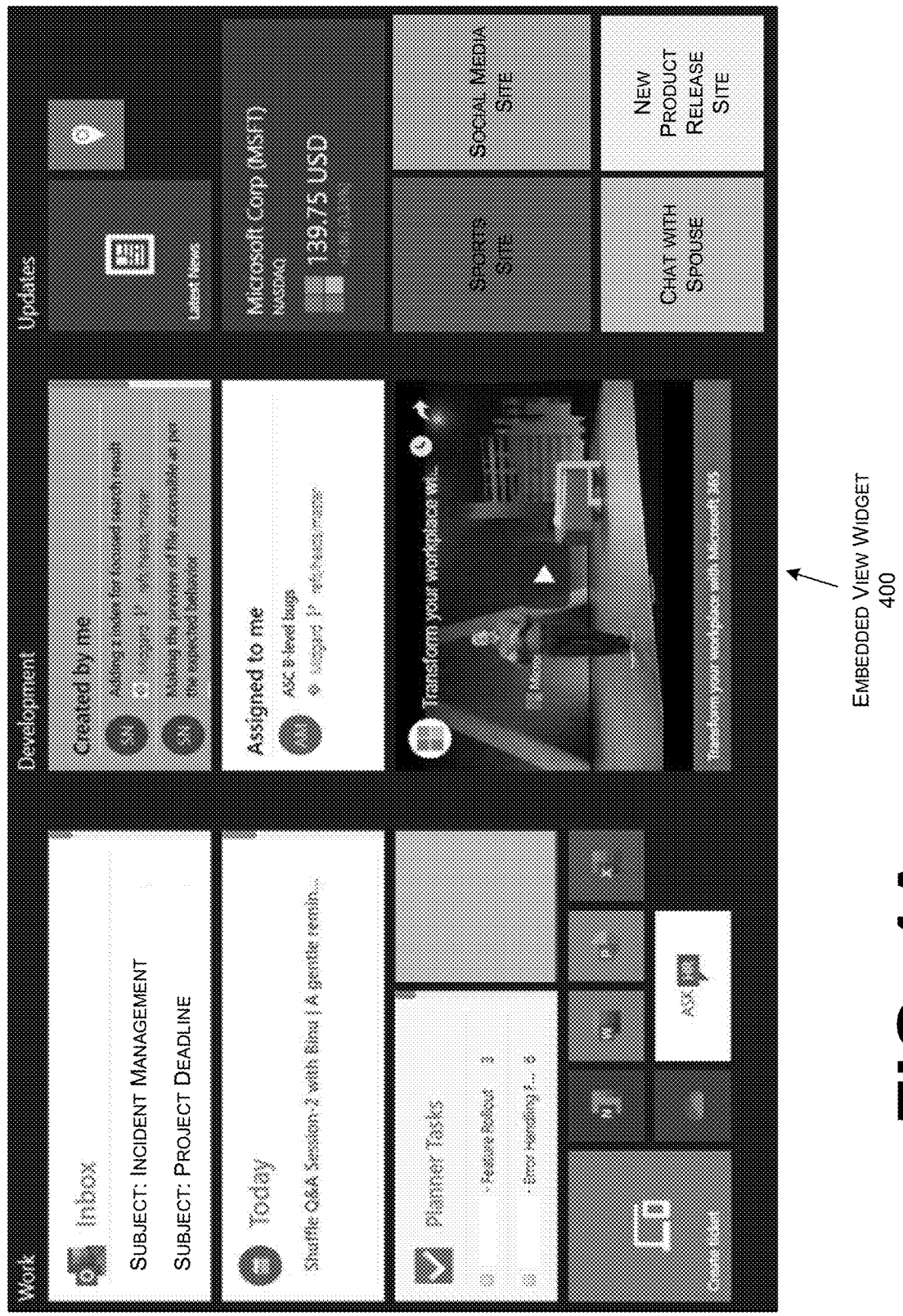
FIG. 4A illustrates an example of an embedded view type widget.

FIG. 4A illustrates an example of an embedded view type widget 400. As described above, widget tiles can be configured as selectable UI elements such that they can be activated via a mouse click, a touch, a key press, or some other sort of user input. An embedded view widget 400 is configured to initially retrieve and display, while the tile is in an inactivated state, first data that represents the target location. In the example of FIG. 4A, the first data can be a still image, such as a paused "shot" from a streaming channel. When the tile associated with the streaming channel is selected and activated by a user, the embedded view widget 400 is configured to continually retrieve and display second data from the target location and display the second data in the single UI view. The second data is more in-depth compared to the first data. For example, the second data may include video data. Consequently, via the use of an embedded view widget 400, the user does not have to go to a different UI to view the streaming channel, but rather can see the video with the parameters of a single UI view that provides information from multiple different network locations.

Figure 4B:
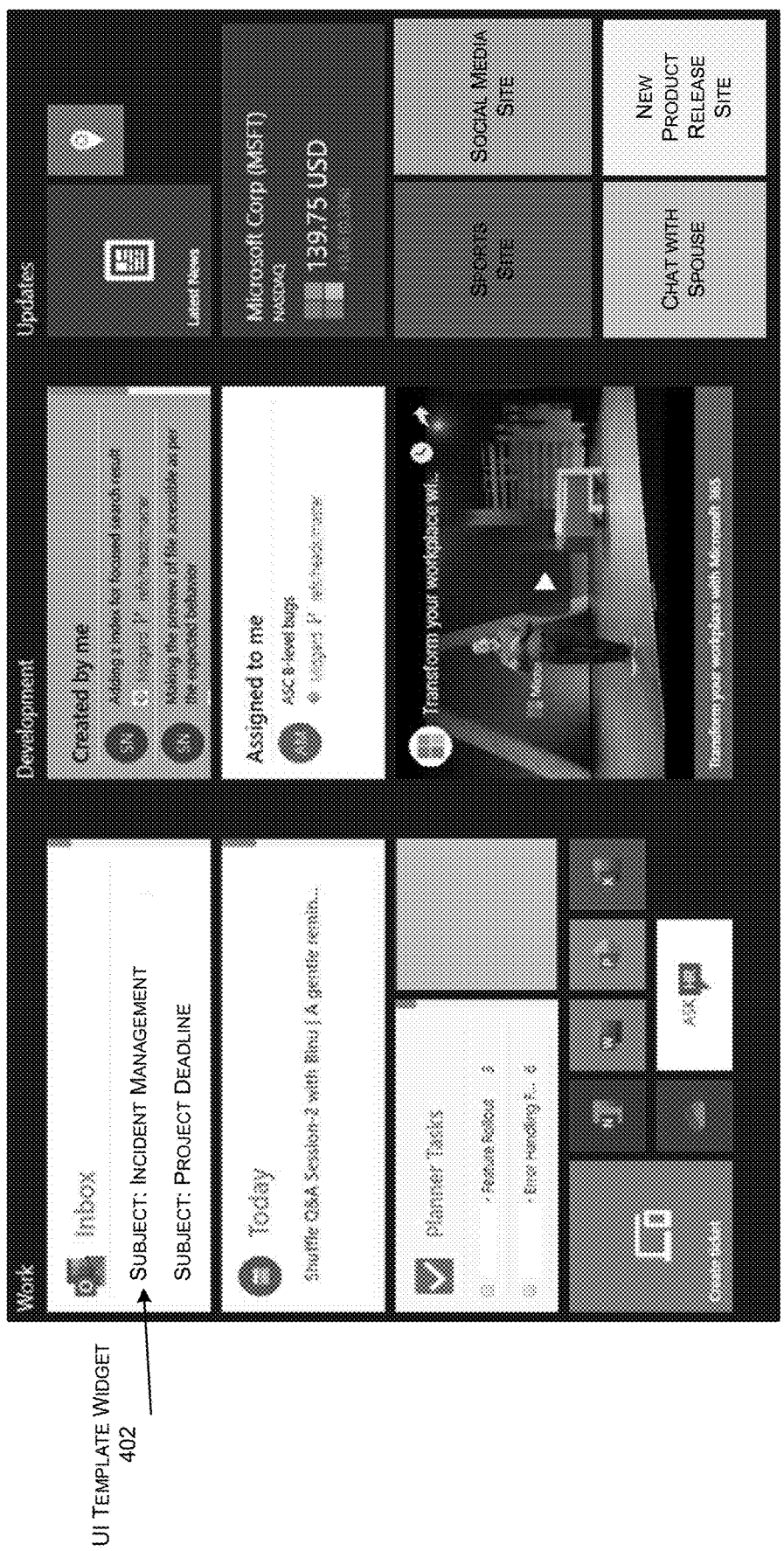
FIG. 4B illustrates an example of a UI template type widget.

FIG. 4B illustrates an example of a UI template type widget 402. As describe above, a UI template, such as an adaptive card, can retrieve standard format data (e.g., JSON data) from a target location. When delivered to a widget tile on the single UI view, the JSON data is transformed into a native or localized UI that automatically adapts to its surroundings. As shown in FIG. 4B, the UI template widget 402 transforms email items from an email inbox into a widget tile. In this way, the user can see and/or interact with their email inbox within the confines of the single UI view. Consequently, a user can configure a UI template widget 402 to select a preconfigured UI template from a UI template library (e.g., an adaptive card library) that allows for the retrieval of standard format data (e.g., JSON data) via API calls. In various examples, a UI template library customized version configured on top of a more generic UI library. For example, the system can provide a selectable option to customize and use adaptive cards already configured to show emails from an email platform (e.g., MICROSOFT OUTLOOK).

In various examples, a UI template type widget 402 can use authorization tokens so that protected information (e.g., user account information such as emails in an inbox) can be retrieved over a period of time. For example, a series of authorization tokens enables the refreshing of data (e.g., checking for newly received emails) every ten seconds, thirty seconds, one minute, etc. The refresh period can be a default time period defined by the single UI view of the target application. Alternatively, the refresh period can be a user-defined time period. In situations where an authorization token is about to expire and cannot be updated, a notification can be displayed within a tile indicating that access to fresh content is not possible due to an expired authorization token. Alternatively, the system can implement an authentication module that requires user to sign in once using credentials (e.g., account name and password) and then the authentication module is configured to take over the responsibility of fetching tokens.

Figure 4C:
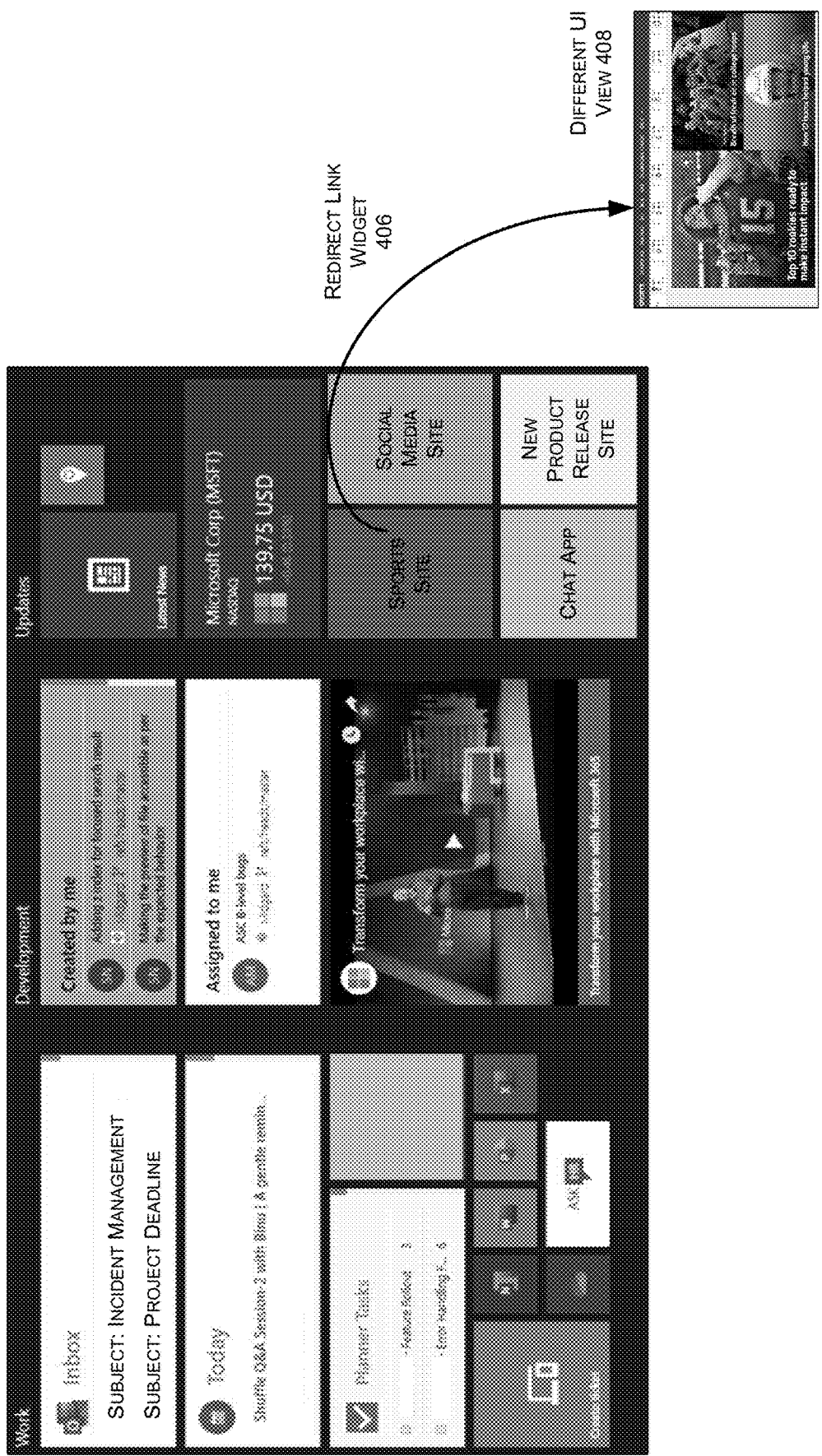
FIG. 4C illustrates an example of a redirect link type widget.

FIG. 4C illustrates an example of a redirect link type widget 406. A redirect link widget 406 redirects a user to a separate UI view associated with a target location when the widget is activated and selected by a user. As described above, in one example, the target location is a URL for a stie. Accordingly, the initial data retrieved and displayed via a redirect link widget 406 is high-level data (e.g., select pieces of information) that the user can view to grasp a general and/or a temporal understanding of a state or a context of content at the site, such as a sports site. If the user sees something of interest in a tile for the redirect link widget 406, the user may activate the widget by clicking on the tile and the user is redirected to the actual site 408 so the user can see more detailed information. This redirect action will take the user away from the single UI view and redirect the use to a different UI view 408 (e.g., switch active tabs in a browser from the homepage to the actual site UI).

Figure 4D:
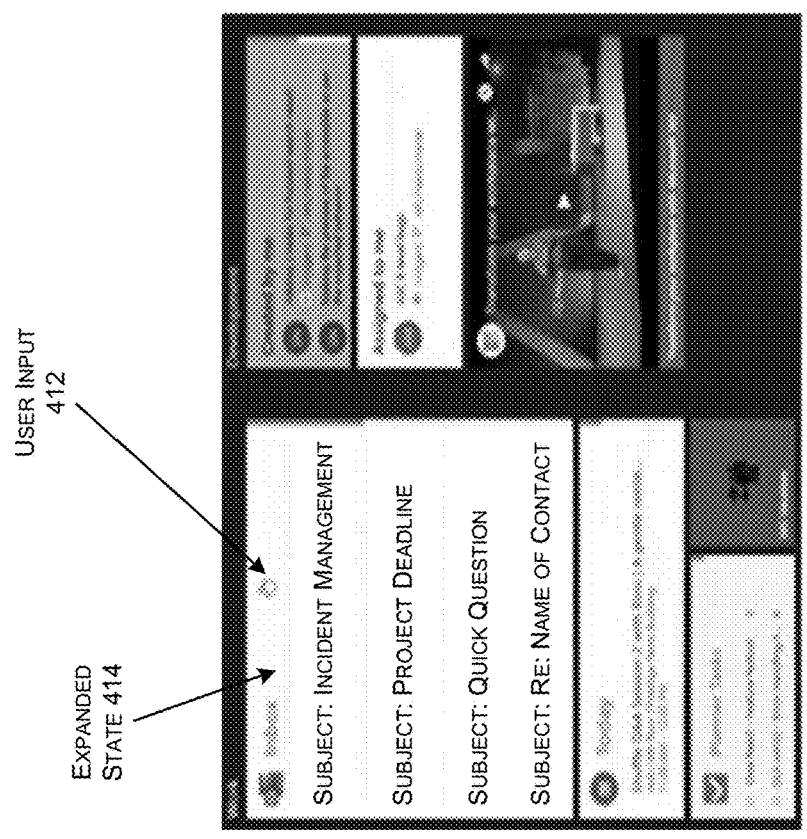
FIG. 4D illustrates an example of how a widget can be displayed in an expanded state.
Figure 4D:
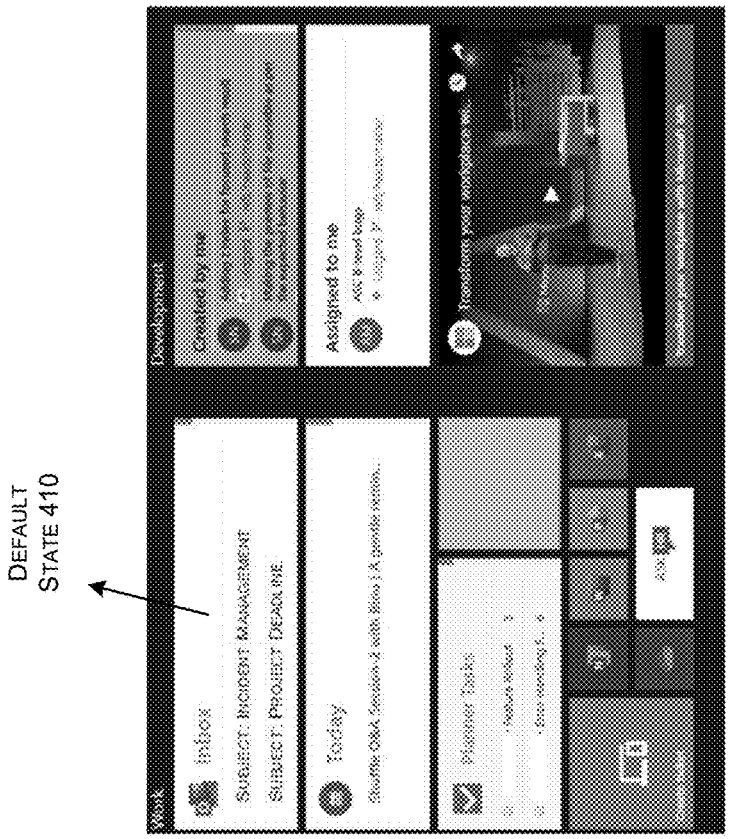

FIG. 4D illustrates an example of how a widget can be displayed in an expanded state. The user can designate the ability for a widget to switch from a default state and size to an expanded state and size. The switch may occur when the widget tile is activated. As shown on the left of FIG. 4D, two email items are displayed in the default state 410 of a widget configured to display a user's inbox. Upon activation of the widget based on user input 412, the tile is displayed in an expanded state 414 that makes room for additional email items to be displayed (e.g., a transition from a space that accommodates two email items to a state that accommodates four email items). Consequently, the expanded state 414 increases the amount of UI space for a widget tile compared to the default state 410. In this way, the user can see more data retrieved from a target location and/or more easily interact with the data without moving away from the single UI view. This ability to expand is most likely associated with embedded view widgets or UI template widgets, as activation of a redirect link widget takes the user away from the single UI view.

In various examples, the single UI view may enable a user to scroll within an individual tile so the user can see data that is initially not displayed. Moreover, in some examples, a user can designate a tile so that it is not selectable (e.g., the display of an equity price). In this way, the single view UI can avoid inadvertent user inputs.

Figure 5:
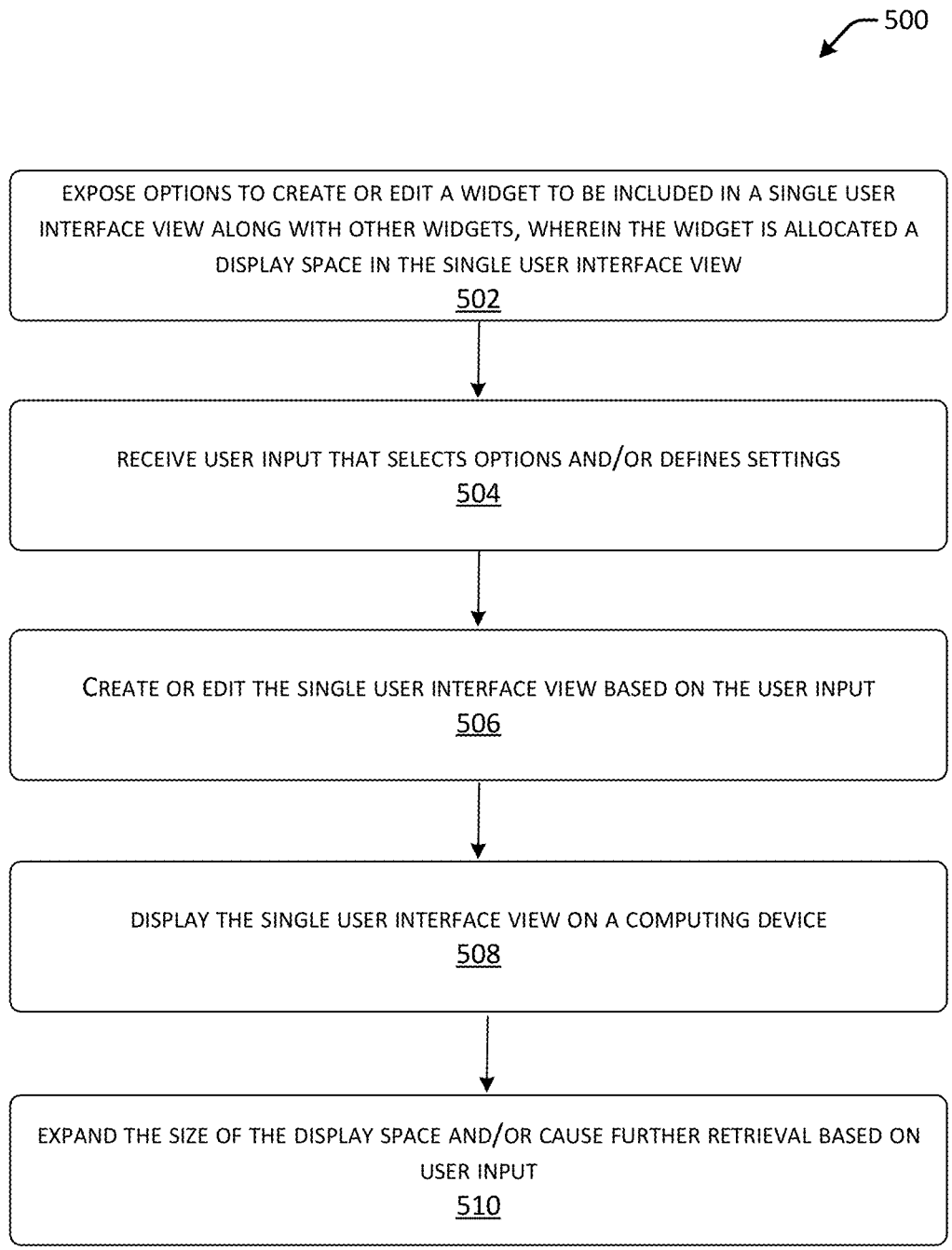
FIG. 5 is a flow diagram of an example method for configuring and displaying a single UI view so a user can see information from multiple sites in one place.

FIG. 5 is a flow diagram illustrating routines describing aspects of the present disclosure. The logical operations described herein with regards to FIG. 5 can be implemented (1) as a sequence of computer implemented acts or program modules running on a device and/or (2) as interconnected machine logic circuits or circuit modules within a device.

For ease of understanding, the process discussed in this disclosure is delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-readable media. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including processing units in single-processor or multiprocessor systems, minicomputers, mainframe computers, personal computers, head-mounted display devices, hand-held computing devices, microprocessor-based, programmable consumer electronics, combinations thereof, and the like.

For example, the operations can be implemented by dynamically linked libraries ("DLLs"), statically linked libraries, functionality produced by an application programming interface ("API"), a compiled program, an interpreted program, a script, a network service or site, or any other executable set of instructions. Data can be stored in a data structure in one or more memory components. Data can be retrieved from the data structure by addressing links or references to the data structure.

FIG. 5 is a flow diagram of an example method 500 for configuring and displaying a single UI view so a user can see information from multiple sites in one place.

At operation 502, a component on a computing device (e.g., browser, operating system) exposes options to create or edit a widget to be included in a single user interface view along with other widgets. As described above, the widget is allocated a display space (e.g., a tile) in the single user interface view. At operation 504, the component receives user input that selects options and/or defines settings. This can include a type of widget, whether the tile allocated to the widget in the single user interface view is to transition from a default state to an expanded state upon activation of the tile, a tile size, a tile order (e.g., a position of a tile within a displayed category), tile colors, a target location, etc. At operation 506, the component creates or edits the single user interface based at least in part on the received user input.

At operation 508, the component displays the tiles associated with the widgets that have been configured by a user. This display of the tiles may be configured to automatically and/or continually retrieve and/or display data based on the configuration of the widgets (e.g., a UI template type). At operation 510, a user can interact with a tile to expand the size and/or to cause further retrieval of data (e.g., streaming video in an embedded view).

Figure 6:
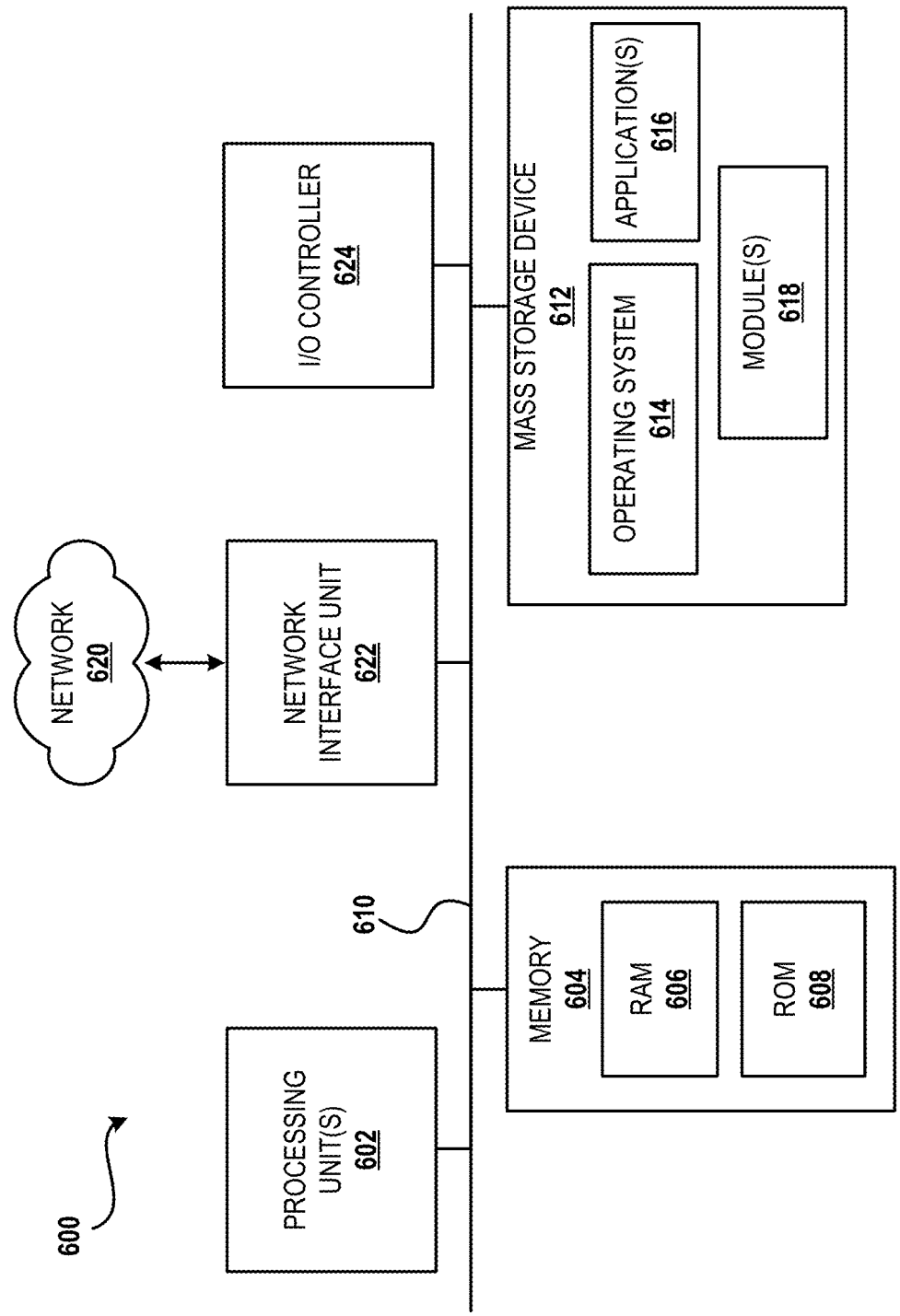
FIG. 6 is a computer architecture diagram illustrating an illustrative computer hardware and software architecture for a computing system capable of implementing aspects of the techniques and technologies presented herein.

FIG. 6 shows additional details of an example computer architecture 600 for a device, such as the system 202, capable of executing computer instructions (e.g., a module or a program component described herein). The computer architecture 600 illustrated in FIG. 6 includes processing unit(s) 602, a system memory 604, including a random access memory 606 ("RAM") and a read-only memory ("ROM") 608, and a system bus 610 that couples the memory 604 to the processing unit(s) 602.

Processing unit(s), such as processing unit(s) 602, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 600, such as during startup, is stored in the ROM 608. The computer architecture 600 further includes a mass storage device 612 for storing an operating system 614, application(s) 616, modules 618 (e.g., the widget module 204, the display module 206), and other data described herein.

The mass storage device 612 is connected to processing unit(s) 602 through a mass storage controller connected to the bus 610. The mass storage device 612 and its associated computer-readable media provide non-volatile storage for the computer architecture 600. Although the description of computer-readable media contained herein refers to a mass storage device, it should be appreciated by those skilled in the art that computer-readable media can be any available computer-readable storage media or communication media that can be accessed by the computer architecture 600.

Computer-readable media can include computer storage media and/or communication media. Computer storage media can include one or more of volatile memory, non-volatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer storage media, communication media can embody computer-readable instructions, data structures, program modules, or other data in a modulated data signal, such as a carrier wave, or other transmission mechanism. As defined herein, computer storage media does not include communication media. That is, computer storage media does not include communications media consisting solely of a modulated data signal, a carrier wave, or a propagated signal, per se.

According to various configurations, the computer architecture 600 may operate in a networked environment using logical connections to remote computers through the network 620. The computer architecture 600 may connect to the network 620 through a network interface unit 622 connected to the bus 610. The computer architecture 600 also may include an input/output controller 624 for receiving and processing input from a number of other devices, including a keyboard, mouse, touch, or electronic stylus or pen. Similarly, the input/output controller 624 may provide output to a display screen, a printer, or other type of output device.

It should be appreciated that the software components described herein may, when loaded into the processing unit(s) 602 and executed, transform the processing unit(s) 602 and the overall computer architecture 600 from a general-purpose computing system into a special-purpose computing system customized to facilitate the functionality presented herein. The processing unit(s) 602 may be constructed from any number of transistors or other discrete circuit elements, which may individually or collectively assume any number of states. More specifically, the processing unit(s) 602 may operate as a finite-state machine, in response to executable instructions contained within the software modules disclosed herein. These computer-executable instructions may transform the processing unit(s) 602 by specifying how the processing unit(s) 602 transition between states, thereby transforming the transistors or other discrete hardware elements constituting the processing unit(s) 602.

Figure 7:
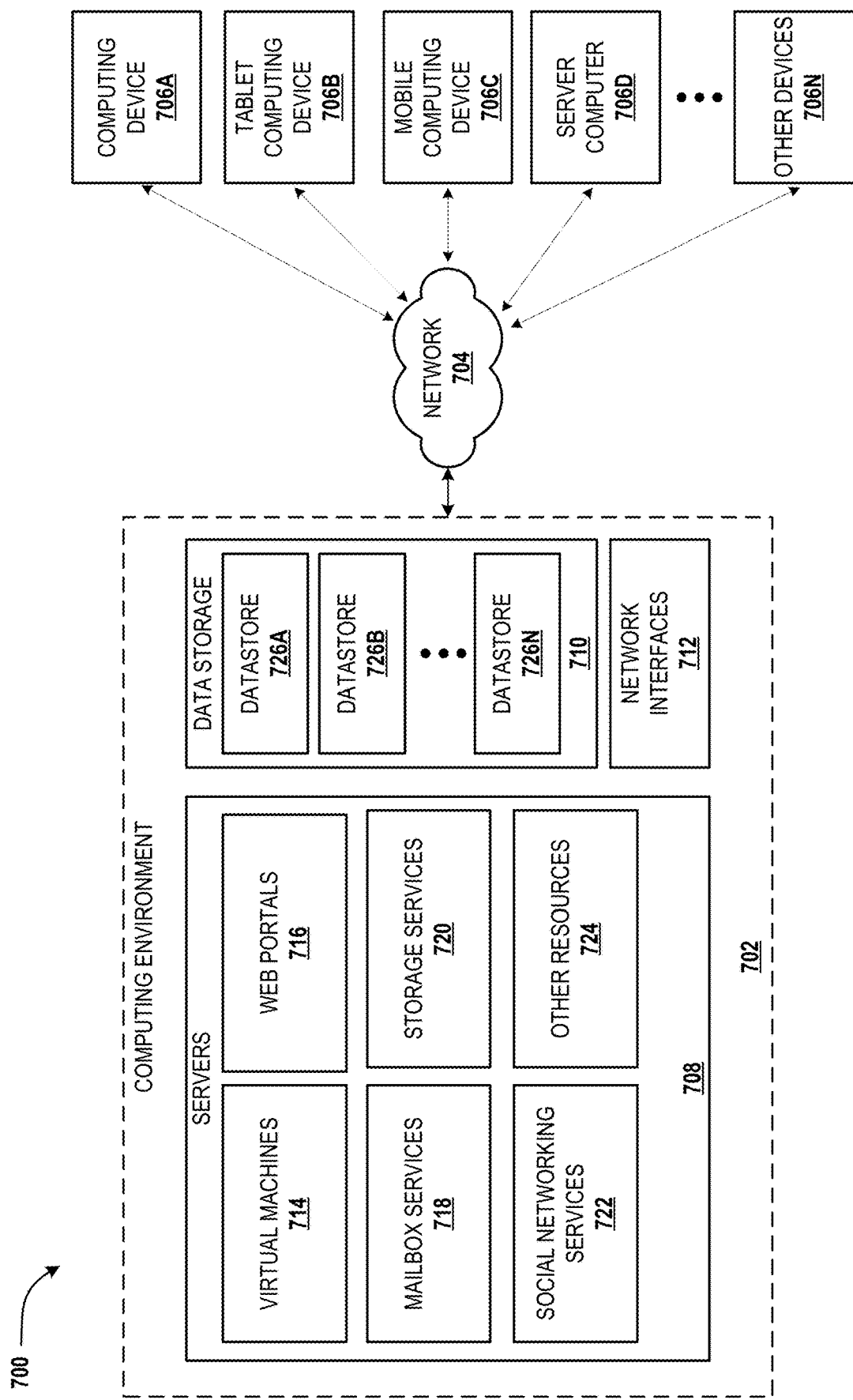
FIG. 7 is a diagram illustrating a distributed computing environment capable of implementing aspects of the techniques and technologies presented herein.

FIG. 7 depicts an illustrative distributed computing environment 700 within which the techniques described herein can be implemented. For example, the distributed computing environment 700 can includes resources that can provide a service to user devices.

Accordingly, the distributed computing environment 700 can include a computing environment 702 operating on, in communication with, or as part of the network 704. The network 704 can include various access networks. One or more client devices 706A-706N (hereinafter referred to collectively and/or generically as "clients 706" and also referred to herein as computing devices 706) can communicate with the computing environment 702 via the network 704. In one illustrated configuration, the clients 706 include a computing device 706A such as a laptop computer, a desktop computer, or other computing device; a slate or tablet computing device ("tablet computing device") 706B; a mobile computing device 706C such as a mobile telephone, a smart phone, or other mobile computing device; a server computer 706D; and/or other devices 706N. It should be understood that any number of clients 706 can communicate with the computing environment 702.

In various examples, the computing environment 702 includes servers 708, data storage 710, and one or more network interfaces 712. The servers 708 can host various services, virtual machines, portals, and/or other resources. In the illustrated configuration, the servers 708 host virtual machines 714, Web portals 716, mailbox services 718, storage services 720, and/or, social networking services 722. As shown in FIG. 7 the servers 708 also can host other services, applications, portals, and/or other resources ("other resources") 724.

As mentioned above, the computing environment 702 can include the data storage 710. According to various implementations, the functionality of the data storage 710 is provided by one or more databases operating on, or in communication with, the network 704. The functionality of the data storage 710 also can be provided by one or more servers configured to host data for the computing environment 702. The data storage 710 can include, host, or provide one or more real or virtual datastores 726A-726N (hereinafter referred to collectively and/or generically as "datastores 726"). The datastores 726 are configured to host data used or created by the servers 808 and/or other data. That is, the datastores 726 also can host or store web page documents, word documents, presentation documents, data structures, algorithms for execution by a recommendation engine, and/or other data utilized by any application program. Aspects of the datastores 726 may be associated with a service for storing files.

The computing environment 702 can communicate with, or be accessed by, the network interfaces 712. The network interfaces 712 can include various types of network hardware and software for supporting communications between two or more computing devices including, but not limited to, the computing devices and the servers. It should be appreciated that the network interfaces 712 also may be utilized to connect to other types of networks and/or computer systems.

It should be understood that the distributed computing environment 700 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 700 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 700 to utilize the functionality described herein for providing the techniques disclosed herein, among other aspects.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

The disclosure presented herein also encompasses the subject matter set forth in the following clauses.

Example Clause A, a method comprising: exposing options to create or edit a widget to be included in a single user interface view along with other widgets, wherein the widget is allocated a display space in the single user interface view; receiving first user input associated with a first option that selects a type of the widget from a plurality of types including: an embedded view type that retrieves, upon activation of the display space, data from a target location and that displays the data within the display space; a template type that describes a template for displaying data retrieved from a target location within the display space in a standard format; and a redirect link type that redirects a user, upon activation of the display space, to a separate user interface associated with a target location; receiving second user input associated with a second option that selects a category for the widget; receiving third user input associated with a third option that selects whether the display space allocated to the widget in the single user interface view is to transition from a first state to a second state upon activation of the display space; creating or editing, by one or more processing units, the widget within the single user interface view based at least in part on the first user input, the second user input, and the third user input; and displaying the single user interface view on a computing device.

Example Clause B, the method of Example Clause A, wherein the template type is configured to: use authorization tokens to refresh the data retrieved from the target location over a period of time; or an authentication module that requires a user to sign into an account at least one time using verified credentials.

Example Clause C, the method of Example Clause A or Example Clause B, wherein the data retrieved by the embedded view type comprises one of streaming video, a really simple syndication (RSS) feed, or map routes or directions.

Example Clause D, the method of any one of Example Clauses A through C, wherein the target location comprises a web site or a web application identified by a uniform resource locator.

Example Clause E, the method of any one of Example Clauses A through D, wherein the single user interface view comprises a homepage displayed in a tab of a browser.

Example Clause F, the method of any one of Example Clauses A through D, wherein the single user interface view comprises a homepage displayed in a mobile application.

Example Clause G, the method of any one of Example Clauses A through F, further comprising receiving fourth user input associated with a fourth option that selects a size of the display space allocated to the widget in the single user interface view.

Example Clause H, the method of any one of Example Clauses A through F, further comprising receiving fourth user input associated with a fourth option that selects a text color and a background color of the display space allocated to the widget in the single user interface view.

Example Clause I, a device: one or more processing units; and computer-readable storage media storing instructions, that when executed by the one or more processing units, configure the device to perform operations comprising: exposing options to create or edit a widget to be included in a single user interface view along with other widgets, wherein the widget is allocated a display space in the single user interface view; receiving first user input associated with a first option that selects a type of the widget; receiving second user input associated with a second option that selects whether the display space allocated to the widget in the single user interface view is to transition from a default state to an expanded state upon activation of the display space; creating or editing the widget within the single user interface view based at least in part on the first user input and the second user input; and displaying the single user interface view on a computing device.

Example Clause J, the device of Example Clause I, wherein the type of the widget comprises an embedded view type that retrieves, upon activation of the display space, data from a target location and that displays the data within the display space.

Example Clause K, the device of Example Clause I, wherein the type of the widget comprises a template type that describes a template for displaying data retrieved from a target location within the display space in a standard format.

Example Clause L, the device of Example Clause K, wherein the template type is configured to: use authorization tokens to refresh the data retrieved from the target location over a period of time; or an authentication module that requires a user to sign into an account at least one time using verified credentials.

Example Clause M, the device of Example Clause I, wherein the type of the widget comprises a redirect link type that redirects a user, upon activation of the display space, to a separate user interface associated with a target location.

Example Clause N, the device of any one of Example Clauses I through M, wherein the operations further comprise receiving third user input associated with a third option that selects a category for the widget, wherein the widget is created or edited within the single user interface view based at least in part on the first user input, the second user input, and the third input.

Example Clause O, the device of any one of Example Clauses I through N, wherein an individual widget displayed in the single user interface view is configured for user interaction and performance of corresponding functionality based on the user interaction.

Example Clause P, a device: one or more processing units; and computer-readable storage media storing instructions, that when executed by the one or more processing units, configure the device to perform operations comprising: displaying, as part of a homepage in a browser or an application, a plurality of display spaces associated with a plurality of widgets that have been configured by a user, wherein an individual widget is configured to retrieve data from a target location; receiving user input that selects a display space of the plurality of display spaces, wherein the selected display space displays a first amount of the retrieved data; in response to receiving the user input, expanding a size of the display space from a first size to a second size; and displaying the first amount of the retrieved data within the selected display space along with a second amount of the retrieved data that fits in the second size but not the first size.

Example Clause Q, the device of Example Clause P, wherein the widget comprises an embedded view type widget that embeds the retrieved data within the selected display space.

Example Clause R, the device of Example Clause P, wherein the widget comprises a template type widget that describes a template for displaying the retrieved data within the selected display space in a standard format.

Example Clause S, the device of Example Clause R, wherein the template type widget is configured to: use authorization tokens to refresh the data retrieved from the target location over a period of time; or an authentication module that requires a user to sign into an account at least one time using verified credentials.

Example Clause T, the device of any one of Example Clauses P through S, wherein the plurality of widgets are displayed in different categories defined by the user.

Conditional language such as, among others, "can," "could," "might" or "may," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example. Conjunctive language such as the phrase "at least one of X, Y or Z," unless specifically stated otherwise, is to be understood to present that an item, term, etc. may be either X, Y, or Z, or a combination thereof.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole" unless otherwise indicated or clearly contradicted by context.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different types, two different tiles, etc.).

In closing, although the various configurations have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter. All examples are provided for illustrative purposes and is not to be construed as limiting.

What is claimed is:

1. A method comprising:
    exposing options to create or edit a widget to be included in a single user interface view along with other widgets, wherein the widget is allocated a display space in the single user interface view;
    receiving first user input associated with a first option that selects a type of the widget from a plurality of types including:
        an embedded view type that retrieves, upon activation of the display space, data from a target location and that displays the data within the display space;
        a template type that describes a template for retrieving user data from an application in association with a user account and for displaying the user data within the display space in a standard format, wherein:

the template type uses authorization tokens to refresh the user data retrieved from the application in association with the user account over a period of time or an authentication module that requires a user to sign in to the user account at least one time using verified credentials; and the template type enables a user to interact with the user data thereby causing the application to perform functions based on the interaction; and a redirect link type that redirects a user, upon activation of the display space, to a separate user interface associated with a target location;

receiving second user input associated with a second option that selects a category for the widget, from a plurality of categories defined by a user, wherein the single user interface view includes separate display areas for grouping related widgets into individual ones of the plurality of categories defined by the user;

receiving third user input associated with a third option that selects whether the display space allocated to the widget in the single user interface view is to transition from a first state to a second state upon activation of the display space;

creating or editing, by one or more processing units, the widget within the single user interface view based at least in part on the first user input, the second user input, and the third user input; and displaying the single user interface view on a computing device.

2. The method of claim 1, wherein the data retrieved by the embedded view type comprises one of streaming video, a really simple syndication (RSS) feed, or map routes or directions.

3. The method of claim 1, wherein the target location comprises a web site or a web application identified by a uniform resource locator.

4. The method of claim 1, wherein the single user interface view comprises a homepage displayed in a tab of a browser.

5. The method of claim 1, wherein the single user interface view comprises a homepage displayed in a mobile application.

6. The method of claim 1, further comprising receiving fourth user input associated with a fourth option that selects a size of the display space allocated to the widget in the single user interface view.

7. The method of claim 1, further comprising receiving fourth user input associated with a fourth option that selects a text color and a background color of the display space allocated to the widget in the single user interface view.

8. The method of claim 1, wherein the type of widget is the embedded view type and the widget is configured to enable a user to scroll through the data within the display space allocated to the widget.

9. The method of claim 1, wherein the type of widget is the template type and the widget is configured to enable a user to scroll through the user data within the display space allocated to the widget.

10. A device comprising:
one or more processing units; and
computer-readable storage media storing instructions, that when executed by the one or more processing units, configure the device to perform operations comprising:
exposing options to create or edit a widget to be included in a single user interface view along with other widgets, wherein the widget is allocated a display space in the single user interface view, the display space associated with a category defined by a user;

receiving first user input associated with a first option that selects a type of the widget, wherein type of widget includes a template type that:

retrieves user data from an application in association with a user account and for displaying the user data;

uses authorization tokens to refresh the user data retrieved from the application in association with the user account over a period of time or an authentication module that requires a user to sign in to the user account at least one time using verified credentials; and enables a user to interact with the user data thereby causing the application to perform functions based on the interaction;

receiving second user input associated with a second option that selects whether the display space allocated to the widget in the single user interface view is to transition from a default state to an expanded state upon activation of the display space;

creating or editing the widget within the single user interface view based at least in part on the first user input and the second user input; and displaying the single user interface view on a computing device.

11. The device of claim 10, wherein the operations further comprise receiving third user input associated with a third option that selects the category for the widget, wherein the widget is created or edited within the single user interface view based at least in part on the first user input, the second user input, and the third input.

12. The device of claim 10, wherein the widget is configured to enable a user to scroll through the user data within the display space allocated to the widget.

13. A device comprising:
one or more processing units; and
computer-readable storage media storing instructions, that when executed by the one or more processing units, configure the device to perform operations comprising:
displaying, as part of a homepage in a browser or an application, a plurality of display spaces associated with a plurality of widgets that have been configured by a user, wherein:
an individual widget is configured to retrieve data from a target location and the plurality of display spaces are grouped into individual ones of a plurality of categories defined by a user for the homepage; and
the target location for at least one widget of the plurality of widgets includes an application associated with a user account, the retrieval of the data using authorization tokens to refresh the data retrieved over a period of time or an authentication module that requires a user to sign in to the user account at least one time using verified credentials;

receiving user input that selects a display space of the plurality of display spaces, wherein the selected display space displays a first amount of the retrieved data;

in response to receiving the user input, expanding a size of the display space from a first size to a second size; and displaying the first amount of the retrieved data within the selected display space along with a second amount of the retrieved data that fits in the second size but not the first size.

14. The device of claim 13, wherein at least one other widget comprises an embedded view type widget that embeds the data within the selected display space.

15. The device of claim 13, wherein the at least one widget comprises a template type widget that describes a template for displaying the data within the selected display space in a standard format.

16. The device of claim 13, wherein the plurality categories are defined by the user to separate productivity applications with which the user interacts.

17. The device of claim 13, wherein the at least one widget is configured to enable a user to scroll through the user data within a corresponding display space.

\* \* \* \* \*